INVENTORS
Clarence Noel Cahusac
BY Frank B. Allen

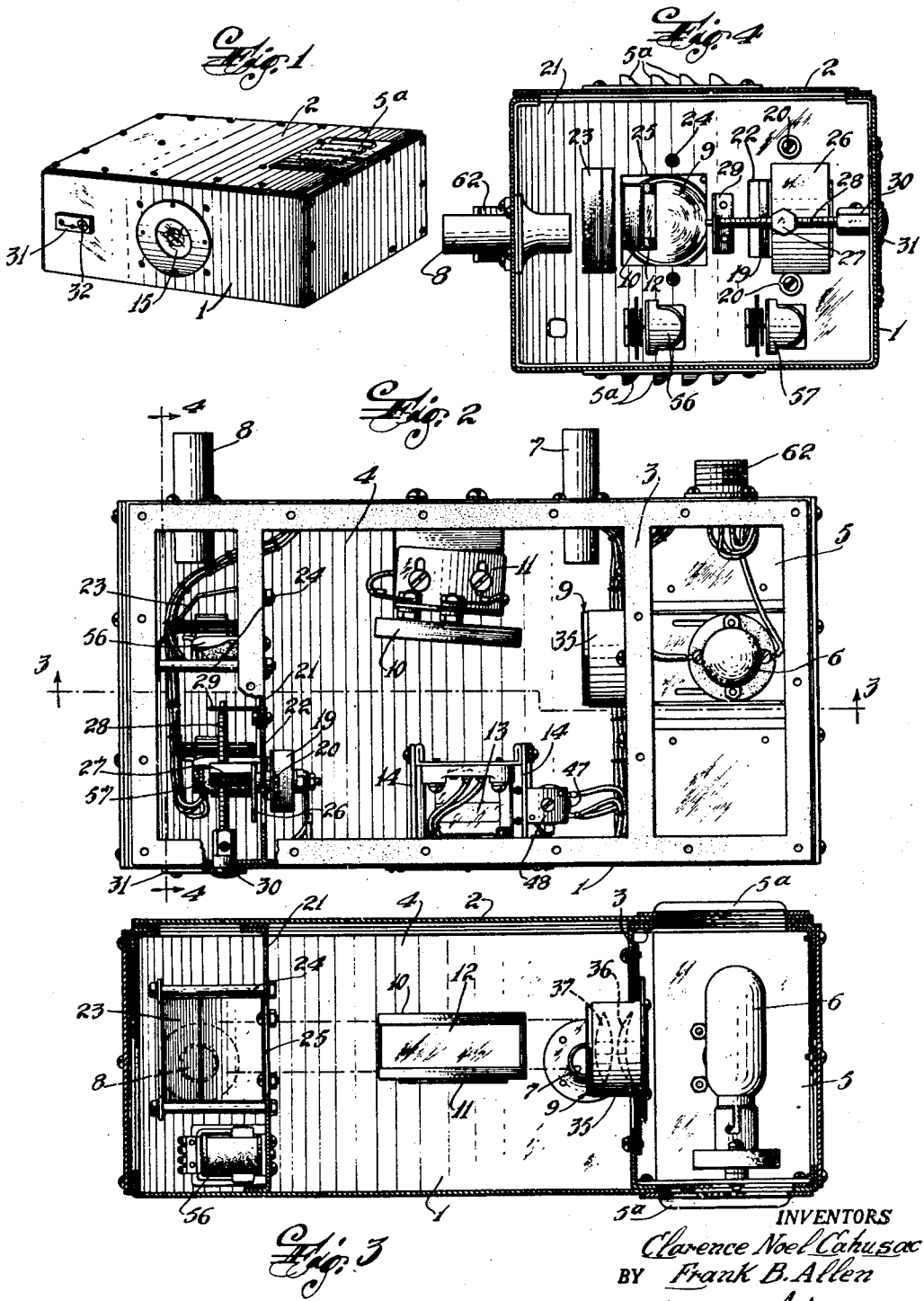

ATTORNEY

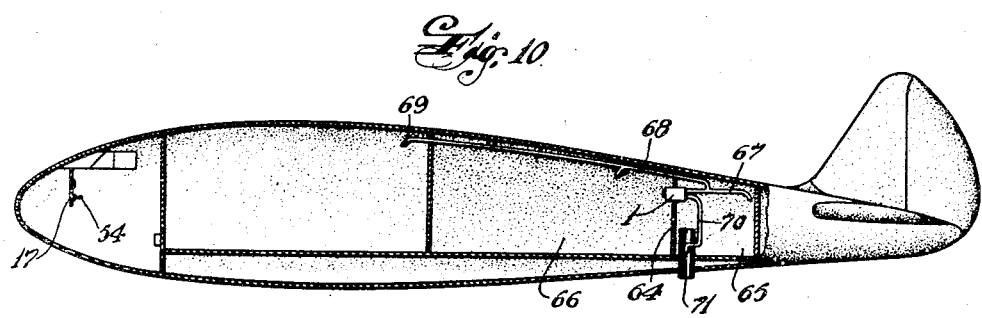
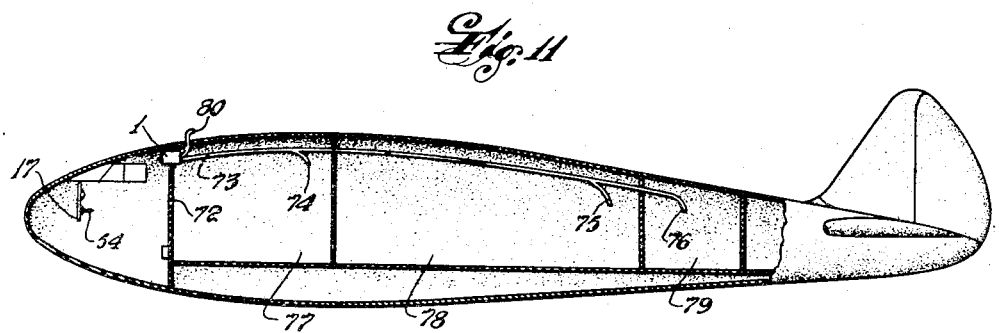
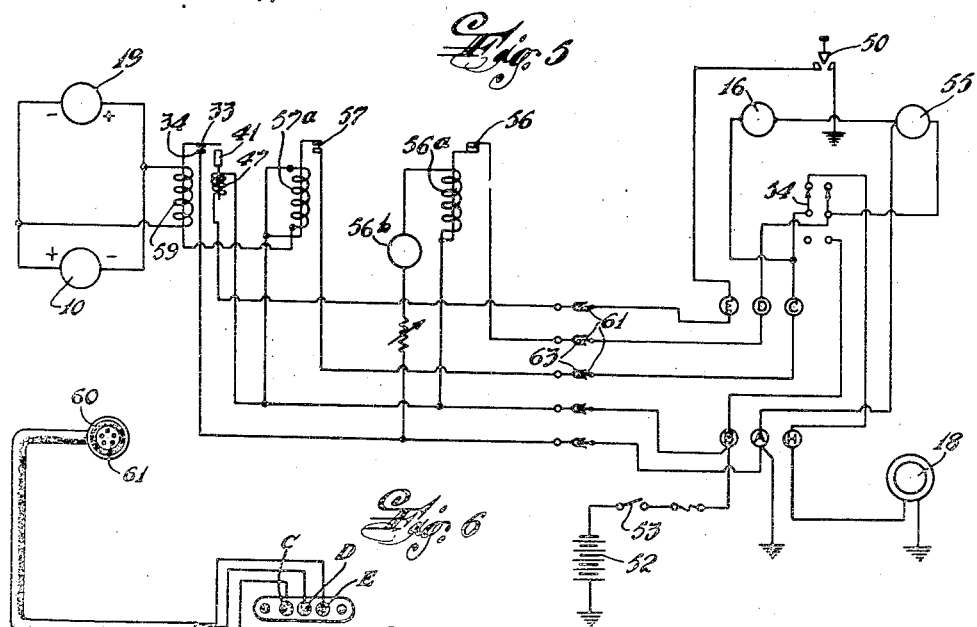
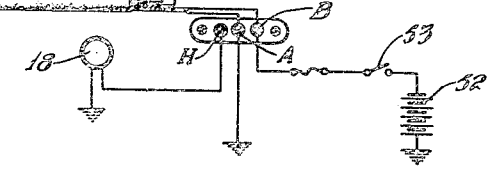

Patented Mar. 15, 1949

2,464,211

UNITED STATES PATENT OFFICE 2,464,211

SMOKE DETECTOR AND SIGNAL FOR AIRPLANES

Clarence Noel Cahusac, Newark, and Frank B. Allen, Verona, N. J., assignors to C-O-Two Fire Equipment Co., Newark, N. J., a corporation of Delaware Application July 13, 1945, Serial No. 604,892

5 Claims. (Cl. 177—311)

This invention relates in general to apparatus for detecting and announcing the existence at a point remote from the apparatus, of the presence of a fluid having particles of matter suspended therein such as smoke; more particularly the invention contemplates such apparatus which is especially adapted for detecting the presence of smoke in the various compartments of an airplane and producing a signal, for example on the instrument board of an airplane, to ensure immediate warning of fires and prompt action to extinguish them.

The smoke detector and signal is of the type described and claimed in United States Patent No. 2,301,367 dated November 10, 1942 which comprises means for producing a beam of light, means for conducting a stream of fluid, such as smoke, into said light beam, a photoelectric element of the generative type located with respect to said beam and said fluid stream to receive light rays reflected from suspended matter in said fluid stream, another photoelectric element located to receive light rays transmitted through said fluid stream, means connecting said photoelectric elements in an electric circuit whereby the photoelectric effects of the second-mentioned element opposes the photoelectric effects of the first-mentioned element and an electrical responsive means, such as a relay or "Sensitrol," in said circuit for controlling the production of an audible or visible signal.

An object of the invention is to provide a novel and improved construction, combination and arrangement of such apparatus with an airplane that the smoke may be drawn from any compartment of the airplane to the detecting apparatus by suction created by movement of the airplane, whereby the necessity for suction fans and the like is obviated.

Figure 1 is a perspective view of a smoke detector forming part of our invention.

Figure 2 is an enlarged top plan view of the smoke detector with the cover plate removed for clearness in illustration.

Figure 3 is a vertical longitudinal sectional view on the line 3—3 of Figure 2.

Figure 4 is a transverse vertical sectional view on the line 4—4 of Figure 2.

Figure 5 is a wiring diagram of the detector and signalling circuit.

Figure 6 is a schematic view showing the manner of connecting the detector unit to the instrument panel.

Figure 10 is a schematic longitudinal vertical sectional view through an airplane fuselage, illustrating one manner of installing the smoke detecting apparatus therein, and Figure 11 is a similar view showing another manner of installing the smoke detecting and signalling apparatus in an airplane.

Figure 7:
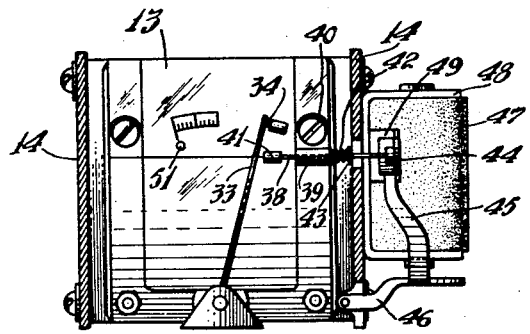
Figure 7 is a detached enlarged front elevational view of the "Sensitrol" and the resetting mechanism therefor.
Figure 8:
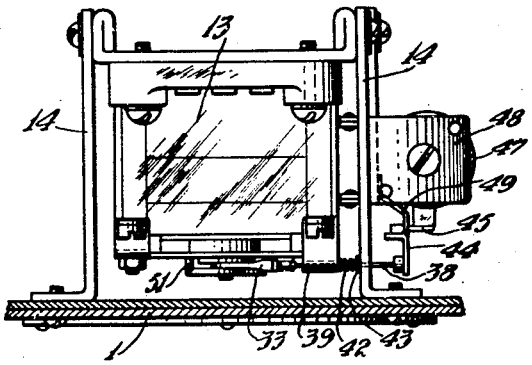
Figure 8 is a top plan view of the parts shown in Figure 7.
Figure 9:
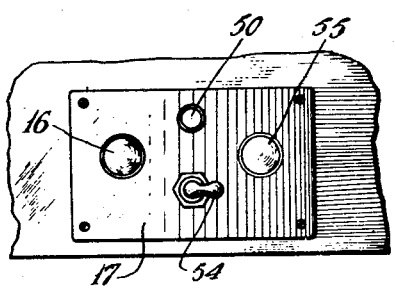
Figure 9 is a front elevational view of the instrument panel.

As shown, the invention includes a detecting unit which comprises a casing 1 preferably having at least a removable top wall 2 and also having a partition 3 which divides the casing into a smoke compartment 4 and a compartment 5 for a light source 6 such as an incandescent lamp, said compartment 5 having openings or louvers 5A for passage of air through the compartment. The smoke compartment has a smoke inlet 7 and a smoke outlet 8 and in the partition 3 is a lens system 9 through which light rays from the lamp 6 are directed into and longitudinally of the compartment 4 so that the light rays, represented by the broken lines, are projected in a parallel beam through the compartment 4.

At least one photoelectric element 10 is adjustably mounted on a bracket 11 within the compartment 4 at one side of the light beam so as to be sensitive to light rays reflected from the suspended matter in the stream of fluid entering the casing through the inlet 2. This photoelectric element may be of any suitable type, such as the current generating barrier layer type and preferably has a large flat rectangular exposed light sensitive surface 12 and is capable of generating sufficient current to operate a "Sensitrol" without amplification of the electricity. Preferably the light sensitive surface is exposed in close proximity to the outer boundaries of the light beam and is tilted obliquely with respect to the light beam so that said surface is inclined away from the light source as shown in Figure 2. Great sensitivity is thus obtained and at the same time the effect of stray light rays when no smoke is present in the compartment is substantially reduced.

The photoelectric element 10 is connected in circuit with any suitable electrical responsive device, for example a micro-ammeter or, as shown, a "Sensitrol" relay 13 which may be mounted by a frame 14 on the front wall of the casing with its dial or face exposed through a window 15 in said casing wall; and said "Sensitrol" controls another circuit which may include any desired electrically operated device such as a signal lamp 16 located on the instrument panel 17, or a howler or audible signal 18 which may be located at any suitable point. The circuit for connecting the "Sensitrol" in circuit with a source of electricity, said signals and the photoelectric elements are shown in Figure 5 and will be later described.

Another photoelectric element 19 which may be of the same general type as the element 10 is mounted by bolts 20 on a transverse partition 21 on the casing with its rear side directed toward the light source and its light sensitive surface juxtaposed to an opening 22 in said partition 21 so as to be subject to light rays projected through said opening 22 from a reflector 23 which is mounted by bolts 24 on said partition 21 and is juxtaposed to an opening 25 in said partition at the side of the latter opposite the photoelectric element 19. It will be observed that the light rays from the lens 9 may pass through the opening 25, impinge upon the reflector 23 and be directed thereby through the opening 22 on the light sensitive surface of the photoelectric element 19.

To vary the extent of exposure of the photoelectric element 19 to said reflected light rays, a shutter or baffle plate 26 extends across the opening 22 and has connected thereto a nut 27 through which is threaded a screw 28 one end of which is rotatably mounted in a bracket 29 on the partition 21, while its other end is connected to an adjusting head 30 which is rotatably mounted in a plate 31 on the front wall of the casing 1 and provided with suitable means for rotating it such as kerfs 32 for a screw driver.

The photoelectric element 19 is connected in circuit with the photoelectric element 10 and the "Sensitrol" 13 in what is known as an "opposed parallel" arrangement or so that the photoelectric effects of said elements are caused to operate in compensating, differential or opposing relation; in other words, the electrodes of the element 19 are connected respectively to the opposite electrodes of the element 10 (see Figure 5).

With this construction, initially the photoelectric cell circuit is so adjusted that the relay 13 or other device will assume a normal condition, for example to open the signal circuit, when no smoke is present in the casing 1 and when smoke or other fluid containing suspended matter is caused to flow through the casing into the beam of light, some of the light rays will be reflected from the solid particles in the stream upon the photoelectric cell 10 whereupon the relay or other device 13 will be actuated by the current in the photoelectric cell circuit, for example to close the signal circuit. In this connection it may be well to point out that the relay 13 has a pointer or swingable contact arm 33 which is responsive to current in the photoelectric cell circuit and normally is spaced from a fixed contact 34 but is actuated into engagement with said contact when the photoelectric cell circuit is energized.

It will be observed that the cells 10 will be continuously somewhat affected by stray light rays from the beam even when no smoke is present in the compartment 4, and the cell will be further affected by slight variations in the intensity or candle power of the light source 6, which without some means to prevent it will result in irregular or unsteady operation of the "Sensitrol" 13. By rotating a screw 28, the shutter 26 may be adjusted to vary the amount of light reflected from the reflector 23 through the opening 22 upon the balancing cell 19, and thus when no smoke is present in the compartment 4, the effect of the light on the cell 10 may be balanced by the effect of the light on the cell 19 whereby a steady and normal setting of the "Sensitrol" pointer 33 may be obtained.

Use of reflected light for energizing the balancing cell 19 results in small current generation by that cell and this is advantageous where the light is reflected from the suspended particles in the smoke on the main cell 10 because under such conditions large variations or fluctuations in the candle power of the light source 6 will not materially affect or disturb the contact arm 33 of the "Sensitrol." Therefore, this phase of the invention makes it possible to utilize light sources of higher candle power and compensates for large variations in the intensity of the light source.

To obtain a parallel beam of light of maximum diameter consistent with economy in size of light source and the lens, our lens system preferably includes a cylindrical lens holder 35 in which are mounted between the source of light and the cell 10 in the order named, a meniscus lens 36 and a convex lens 37. Such a beam of light facilitates generation of adequate current to operate the "Sensitrol" without current amplification.

When the "Sensitrol" is energized by electricity generated by the photoelectric cell 10, its pointer or contact arm 33 engages the contact 34 which tends to remain in such contact. In accordance with one feature of the invention we provide means for resetting this contact arm from any desired remote point. For this purpose we have shown a resetting rod 38 slidably mounted in a bearing 39 fastened on the frame 40 of the "Sensitrol" 13 and having a resilient head 41 normally held in spaced relation to the contact arm 33 when the latter engages the contact 34, as shown in Figure 7. For so holding the head 41, a compression spring 42 may be interposed between the bearing 39 and a collar 43 on the rod 38. The end of the rod 38 opposite the head 41 is held by the spring 42 in abutting contact with a flange 44 rigidly connected to an arm 45 on an armature lever 46 which is actuated by an electromagnetic coil 47 which in turn is carried by a bracket 48 secured on the partition 21. Normally the spring 42 holds the lever 46 in spaced relation to the electromagnetic coil and movement of the lever under the influence of the spring is limited by a stop arm 49 on the bracket 48. The electromagnetic coil 47 is connected in an electric circuit with a normally open manually operated switch 50 which preferably is mounted on the instrument panel 17, so that when said switch is closed, the coil 47 will be energized to actuate the armature lever 46 and push the resetting rod 38 with a snap action against the contact arm 33 which thereby will be pushed back to its normal position against a zero stop pin 51.

The photoelectric cells, light source, "Sensitrol" and signals may be connected in circuit in different ways but one possible circuit arrangement is shown in Figure 5 of the drawings. The reference character 52 designates a source of electric current one terminal of which is grounded while the other terminal is connected to one terminal of a main circuit switch 53 the other terminal of which is connected to a binding screw B on the instrument panel which in turn is connected to one terminal of a double ball double terminal toggle switch 54 that is also mounted on the instrument panel. Another binding screw A on the instrument panel constitutes the ground connection for the circuit while a screw H is connected to one terminal of the howler 18, the other terminal of which is grounded, said screw H also being connected to one terminal of the toggle switch 54. Also on the instrument panel is a binding screw E for connecting the resetting switch 50 in circuit with the electromagnetic coil 47, a binding screw D for connecting in the circuit a trouble lamp 55 on the instrument panel and a normally closed series relay switch 56 which is mounted on the partition 21 of the casing 1, and a binding screw C which connects in circuit a normally open power relay switch 57 also mounted on the partition 21 of the casing. Preferably a photoelectric exciter lamp 56B is included in the circuit with the coil of the relay 56. The electromagnetic coil 56A for the relay switch 56 is connected to the line circuit through the binding screws A and B while the coil 57A of the relay switch 57 is connected in circuit with and controlled by the "Sensitrol" switch 33, 34 which in turn is operated by the coil 59 which is connected in circuit with the photoelectric cells 10 and 19.

It will be understood that the indicator casing 1 and the instrument panel normally will be located in remote relation to each other; for example the panel will be in the pilot's cabin of the airplane while the detector casing may be mounted in a partition between two of the compartments of the airplane. To facilitate the electrical connections between the instrument panel and the detector casing, a coupling plug member 60 may have its pins 61 electrically connected to the respective binding screws A, BAH, E, D, and C and said pins may cooperate with sockets in a socket member 62 mounted on the casing 1 the sockets of said socket member being connected to the respective relay switches and coils.

It will be clear to those skilled in the art that the indicator casing and the various signals and relays may be mounted in any desired locations or zones to be protected but Figures 10 and 11 show two possible arrangements of the parts of the smoke detecting and signaling system in an airplane. In Figure 10 the instrument panel 17 is mounted in the pilot's cockpit or cabin while the detector casing 1 is mounted in a partition 64 between two compartments 65 and 66. The smoke inlet 7 of the casing 1 is connected to a manifold pipe having branches 67, 68 and 69 to withdraw smoke from each of three compartments in the airplane, while the smoke outlet is connected to a tube 70 the free end of which is disposed in an ejector tube 71 whose ends communicate respectively with the compartment 65 and the atmosphere. With this construction, air currents induced by motion of the airplane will create suction in the pipe 71 so as to draw smoke from any of the compartments of the airplane through the smoke compartment 4 of the smoke detector casing.

In Figure 11 the instrument panel 17 is mounted as shown in Figure 10, while the detector casing 1 is mounted in a partition 72 which divides the pilot's cabin or cockpit from the main portion of the fuselage, the smoke inlet of the casing is connected to a manifold pipe 73 which has branches 74, 75, 76 in the respective compartments 77, 78 and 79 of the airplane. The smoke outlet of the detector casing is connected to a suction tube 80 the free end of which projects from the top of the fuselage and is turned rearwardly so that air currents incident to motion of the airplane will create suction to draw smoke from any of the compartments 77, 78 and 79 through the smoke compartment 4 of the casing 1.

It will be understood by those skilled in the art that if desired a suction pump could be attached to the smoke outlet of the casing to draw the smoke therethrough or a blower could be connected to the branches of the smoke inlet pipe to draw smoke from the respective compartments and force it into the casing 1.

While we have shown and described our invention as embodied in certain details of construction it should be understood that this is primarily for illustrating the principles of the now preferred embodiment of the invention and that the structural details may be modified or changed and the apparatus may be used in other places than airplanes, all within the spirit and scope of the invention.

What we claim is:

1. The combination with a vehicle having an enclosed space to be protected against fire, of apparatus for detecting smoke including a casing having a compartment for circulation of smoke therethrough, a smoke inlet pipe for said compartment and communicating with said enclosed space, a smoke outlet pipe for said compartment having one end projecting from said vehicle so that movement of the vehicle will create suction through said outlet pipe to draw smoke from said enclosed space through said compartment, and means for indicating the presence of smoke in said compartment.

2. The combination with a vehicle having an enclosed space to be protected against fire, of apparatus for detecting smoke including a casing having a compartment for circulation of smoke therethrough, and means for drawing smoke from said enclosed space into said compartment by suction created by movement of said vehicle.

3. Apparatus for detecting smoke, comprising a casing to be located in the zone to be protected, means for conducting a stream of smoke through said casing, means in said casing responsive to the presence of smoke therein for producing an electric current, a relay switch including a pair of contacts movable with respect to each other, one of which in normal position is spaced from the other to open the switch, means actuated by said electric current by which one of said contacts is electromagnetically swung into and held in engagement with the other of said contacts to close said switch, a resetting mechanism normally actuated away from said contacts but movable to separate the contacts, an electromagnet including a coil and means actuated by said coil to operate said resetting mechanism when said coil is energized, and means including a switch located at a point remote from said casing for controlling energization of said coal.

4. The combination with a vehicle having an enclosed space to be protected against fire, of apparatus for detecting smoke including a casing having a compartment for the circulation of smoke therethrough, and means for drawing smoke from said enclosed space into said compartment by suction created by movement of said vehicle, said means comprising a suction tube opening to the atmosphere at one end and having its other end in fluid communication with said compartment.

5. Combination with a vehicle having an enclosed space to be protected against fire, of apparatus for detecting smoke including a casing having a compartment for circulation of smoke therethrough, means for indicating the presence of smoke in said compartment, smoke passage inlet means for said compartment in fluid communication with said enclosed space, and smoke passage outlet means for said compartment opening to the exterior of the vehicle at a position on the vehicle with reference to the movement thereof so that movement of the vehicle will create suction through said outlet means to draw smoke from said enclosed space through said compartment.

CLARENCE NOEL CAHUSAC.
FRANK B. ALLEN.

REFERENCES CITED

The following references are of record in the file of this patent:

UNITED STATES PATENTS

| Number | Name | Date |
| --- | --- | --- |
| 1,755,834 | Marr et al. | Apr. 22, 1930 |
| 1,828,894 | Freygang | Oct. 27, 1931 |
| 2,014,385 | Lamb | Sept. 17, 1935 |
| 2,301,367 | Cahusac et al. | Nov. 10, 1942 |